(12) United States Patent
Grunwald et al.

(10) Patent No.: US 11,841,254 B2
(45) Date of Patent: *Dec. 12, 2023

(54) CLAMP-ON ULTRASONIC TRANSDUCER ARRANGEMENT INDEPENDENT OF MEASURING TUBE DIAMETER AT A MEASURING POINT

(71) Applicant: Endress+Hauser Flowtec AG, Reinach (CH)

(72) Inventors: Sascha Grunwald, Steinen (DE); Oliver Brumberg, Rheinfelden (DE); Alexander Murray, Basel (CH); Andreas Berger, Erschwil (CH); Achim Wiest, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 324 days.

This patent is subject to a terminal disclaimer.

(21) Appl. No.: 17/413,334

(22) PCT Filed: Nov. 21, 2019

(86) PCT No.: PCT/EP2019/082014
§ 371 (c)(1),
(2) Date: Jun. 11, 2021

(87) PCT Pub. No.: WO2020/120090
PCT Pub. Date: Jun. 18, 2020

(65) Prior Publication Data
US 2022/0018693 A1 Jan. 20, 2022

(30) Foreign Application Priority Data
Dec. 13, 2018 (DE) ...................... 10 2018 132 055.8

(51) Int. Cl.
*G01F 1/66* (2022.01)

(52) U.S. Cl.
CPC .............. *G01F 1/662* (2013.01); *G01F 1/666* (2013.01)

(58) Field of Classification Search
None
See application file for complete search history.

(56) References Cited

U.S. PATENT DOCUMENTS

| 4,141,149 A | 2/1979 | George et al. |
| 4,838,127 A | 6/1989 | Herremans et al. |

(Continued)

FOREIGN PATENT DOCUMENTS

| DE | 60212717 T2 | 6/2007 |
| DE | 102008029772 A1 | 12/2009 |

(Continued)

*Primary Examiner* — Harshad R Patel
(74) *Attorney, Agent, or Firm* — Christopher R. Powers; Endress+Hauser (USA) Holding, Inc.

(57) ABSTRACT

An ultrasonic transducer arrangement for a clamp-on ultrasonic, flow measuring point includes a plurality of ultrasonic transducers, each adapted to radiate ultrasonic signals into the measuring tube and/or to receive ultrasonic signals emerging from the measuring tube, wherein a first group of first ultrasonic transducers is arranged on a first side of the measuring tube, and a second group of second ultrasonic transducer is arranged on a second side of the measuring tube opposite the first side, wherein at least one first/second ultrasonic transducer is adapted to receive ultrasonic signals of at least one second/first ultrasonic transducer, respectively, wherein adjoining ultrasonic transducers of the first group have, in each case, first separations from one another, and wherein adjoining ultrasonic transducers of the second group have, in each case, second separations from one another.

17 Claims, 5 Drawing Sheets

(56) References Cited

U.S. PATENT DOCUMENTS

| | | | | |
|---|---|---|---|---|
| 5,533,408 | A | * | 7/1996 | Oldenziel ............. G01F 1/7082 73/861.27 |
| 6,047,602 | A | | 4/2000 | Lynnworth |
| 6,575,043 | B1 | | 6/2003 | Huang et al. |
| 7,832,282 | B2 | | 11/2010 | Ao |
| 8,347,734 | B2 | * | 1/2013 | Berger .................... G01F 1/667 73/861.28 |
| 2003/0172743 | A1 | * | 9/2003 | Ao ......................... G01F 1/667 73/861.27 |
| 2010/0134782 | A1 | * | 6/2010 | Roberts ................. G01B 11/18 356/32 |
| 2011/0094309 | A1 | * | 4/2011 | Berger .................... G01F 1/668 73/861.28 |
| 2018/0149505 | A1 | * | 5/2018 | Ploss ....................... G01F 1/662 |
| 2021/0223078 | A1 | * | 7/2021 | Klemm .................. G01F 1/662 |

FOREIGN PATENT DOCUMENTS

| | | |
|---|---|---|
| DE | 102012109234 A1 | 4/2014 |
| EP | 2154491 A1 | 2/2010 |
| GB | 2185818 A1 | 7/1987 |
| JP | S59214714 A | 12/1984 |
| WO | 9517650 A1 | 6/1995 |
| WO | 2009156250 A1 | 12/2009 |
| WO | 2018162340 A1 | 9/2018 |

\* cited by examiner

CLAMP-ON ULTRASONIC TRANSDUCER ARRANGEMENT INDEPENDENT OF MEASURING TUBE DIAMETER AT A MEASURING POINT

CROSS-REFERENCE TO RELATED APPLICATIONS

The present application is related to and claims the priority benefit of German Patent Application No. 10 2018 132 055.8, filed on Dec. 13, 2018, and International Patent Application No. PCT/EP2019/082014, filed on Nov. 21, 2019, the entire contents of which are incorporated herein by reference.

TECHNICAL FIELD

The present disclosure relates to clamp-on ultrasonic, flow measuring transducers based on the travel time difference principle and methods for commissioning the same for measuring operation.

BACKGROUND

Clamp-on ultrasonic, flow measuring points are applied instead of inline flow measuring points with ultrasonic transducers integrated into a measuring tube, when an installation of a measuring tube of an inline flow measuring point is cumbersome or impossible. Clamp-on ultrasonic, flow measuring points are significantly easier to set up and can be installed on different measuring tubes. They have, however, the disadvantage that ultrasonic transducers of such a measuring point as it comes from the factory can, at most, be only roughly tuned to one another.

The state of the art shows ultrasound transducer arrangements of such flow measuring points, in the case of which the ultrasonic transducers are mounted shiftably relative to one another, in order to permit a fine tuning. This requires, however, technical knowledge and also a certain time consumed. A detouring around this problem is presented in DE102008029772A1, in the case of which two groups, in each case, of a plurality of ultrasonic transducers are placed on an outside of a measuring tube, wherein adjoining ultrasonic transducers of each group have small separations from one another, wherein these separations are slightly different between the groups. In this way, it is achieved that due to a plurality of ultrasonic transducers in many cases an ultrasonic transducer pair connected by an ultrasonic signal path exists and, thus, small changes of process parameters, such as, for example, velocity of sound, can be compensated by changing the ultrasonic transducer pair.

SUMMARY

An object of the invention is to provide an ultrasonic transducer arrangement for a clamp-on, ultrasonic, flow measuring point and a clamp-on ultrasonic, flow measuring point, in the case of which the ultrasonic transducer arrangement is largely independent of measuring tube diameter.

The object is achieved by an ultrasonic transducer arrangement, a clamp-on ultrasonic, flow measuring point, and a method for commissioning the ultrasonic, flow measuring point into operation according to the present disclosure.

An ultrasonic transducer arrangement of the invention for a clamp-on ultrasonic, flow measuring point based on the travel time difference principle comprises:

a plurality of ultrasonic transducers, which are adapted to be arranged on an outside of a measuring tube of the clamp-on flow measuring point, wherein the ultrasonic transducers have, in each case, at least one transducer element for producing and/or receiving ultrasonic signals as well as a coupling element, wherein the coupling element has a first contact area and a second contact area, wherein the transducer element is arranged on the first contact area, and wherein the ultrasonic transducer is adapted by means of the second contact area to be contacted with the measuring tube, wherein the ultrasonic transducers are adapted to radiate ultrasonic signals into the measuring tube and/or to receive ultrasonic signals emerging from the measuring tube, wherein the second contact areas have, in each case, a normal, wherein the normals define a plane, in which ultrasonic signal paths of the ultrasonic signals extend, wherein a first group of first ultrasonic transducers is arranged relative to a measuring tube longitudinal section on a first side of the measuring tube, and wherein a second group of second ultrasonic transducers is arranged relative to the measuring tube longitudinal section on a second side of the measuring tube lying opposite the first side, wherein the coupling elements of the first ultrasonic transducers and second ultrasonic transducers have, in each case, a longitudinal axis, wherein the longitudinal axis has, in each case, an interior angle $\alpha$ at the corresponding second contact area, wherein the ultrasonic signal path extends in the coupling element in the direction of the longitudinal axis, wherein at least one, first/second ultrasonic transducer is adapted to receive ultrasonic signals of at least one, second/first ultrasonic transducer, characterized in that adjoining ultrasonic transducers of the first group have, in each case, first separations from one another, and wherein adjoining ultrasonic transducer of the second group have, in each case, second separations from one another, wherein the first separation and the second separation are unequal, wherein $2*A1 >= A2 >= 1.125*A1$, and especially $1.75*A1 >= A2 >= 1.16*A1$, and preferably $1.6*A1 >= A2 >= 1.25*A1$.

In an embodiment, a relationship between the first separation and second separation corresponds to the following equation:

$(a+1)*A1 = a*A2$ with $b > a > 1$, a is a natural number and b is an upper value for a range of a and is less than 9, and, especially, less than 7, and preferably less than 5.

Advantageously, the first number and the second number both equal a+1.

In an embodiment, the first group of ultrasonic transducers has a first number of ultrasonic transducers, and a second group of ultrasonic transducers has a second number of ultrasonic transducers, wherein:

N1 is greater than or equal to a+1 and especially greater than or equal to a+2,

N2 is greater than or equal to a+1 and especially greater than or equal to a+2.

In an embodiment, the transducer elements have a radial extent rA, wherein $rA > 3/(4*a)*A1*\cos(\alpha)$, and especially $$rA > 1/(2*a)*A1*\cos(\alpha).$$

In an embodiment, the ultrasonic transducer arrangement includes at least a third ultrasonic transducer, which has a signal path, which extends perpendicularly to the second contact area.

In an embodiment, the first group of ultrasonic transducers and the second group of ultrasonic transducers are held, in each case, by a support body, which is adapted for positioning and securing the ultrasonic transducers.

In an embodiment, the ultrasonic transducers in the support body are each individually held.

A clamp-on-ultrasonic, flow measuring point of the invention for measuring a flow velocity of a medium flowing through a measuring tube includes:

the measuring tube for conveying a medium and having a measuring tube axis, an ultrasonic transducer arrangement of the invention according to one or more of the definitions above, wherein the ultrasonic transducer arrangement is oriented in parallel with the measuring tube axis, an electronic measuring/operating circuit for operating the ultrasonic transducers as well as for ascertaining and providing measured values of flow velocity.

In an embodiment, the clamp-on-ultrasonic, flow measuring point includes a curvature sensor for determining an outer diameter of the measuring tube, wherein the curvature sensor has a separation sensor and a spacer, wherein the spacer has a central region and two ends adjoining the central region, wherein the ends are bounded from the central region by a bend or an angle, wherein the spacer is adapted by means of the ends to be contacted with the measuring tube, wherein the central region is adapted to be spaced from the measuring tube, and wherein a cross section, or longitudinal section, through the spacer through the two ends is adapted to extend in parallel with a measuring tube cross section, wherein the separation sensor is arranged on the spacer in the central region, wherein the electronic measuring/operating circuit is adapted to operate the separation sensor.

In an embodiment, the separation sensor is an optical or acoustic, separation sensor.

In a method of the invention for commissioning the clamp-on ultrasonic, flow measuring point into operation, a plurality of first ultrasonic transducers/a plurality of second ultrasonic transducers transmit, simultaneously or offset in time, in each case, an ultrasonic signal, which ultrasonic signals are received by second ultrasonic transducers/first ultrasonic transducers, wherein the electronic measuring/operating circuit determines based on signal strength and/or signal/noise ratio of the received ultrasonic signals at least one ultrasonic transducer pair to be used for a measurement operation.

In an embodiment, the ultrasonic signals are quasi continuous and differ in frequency, or wherein the ultrasonic signals are pulsed and differ in the following feature:

center frequency of a frequency spectrum.

In an embodiment, a medium is conveyed through the measuring tube, wherein in the case of received ultrasonic signals ultrasonic signal portions are examined for presence of a travel time difference, wherein ultrasonic signal portions without travel time difference are excluded in determining an ultrasonic transducer pair to be used.

In the case of a method of the invention for commissioning the clamp-on-ultrasonic, flow measuring point into operation, the third ultrasonic transducer is caused to transmit and to receive an ultrasonic signal, wherein the electronic measuring/operating circuit determines an outer diameter and/or inner diameter based on at least one signal characteristic of the received ultrasonic signal, wherein a usable signal characteristic is, for example:

travel time of a signal reflection.

In a method of the invention for commissioning the clamp-on-ultrasonic, flow measuring point into operation, the electronic measuring/operating circuit determines an outer diameter by means of the curvature sensor.

BRIEF DESCRIPTION OF THE DRAWINGS

The invention will now be described based on examples of embodiments presented in the appended drawing, the figures of which show as follows.

DETAILED DESCRIPTION

Figure 1:
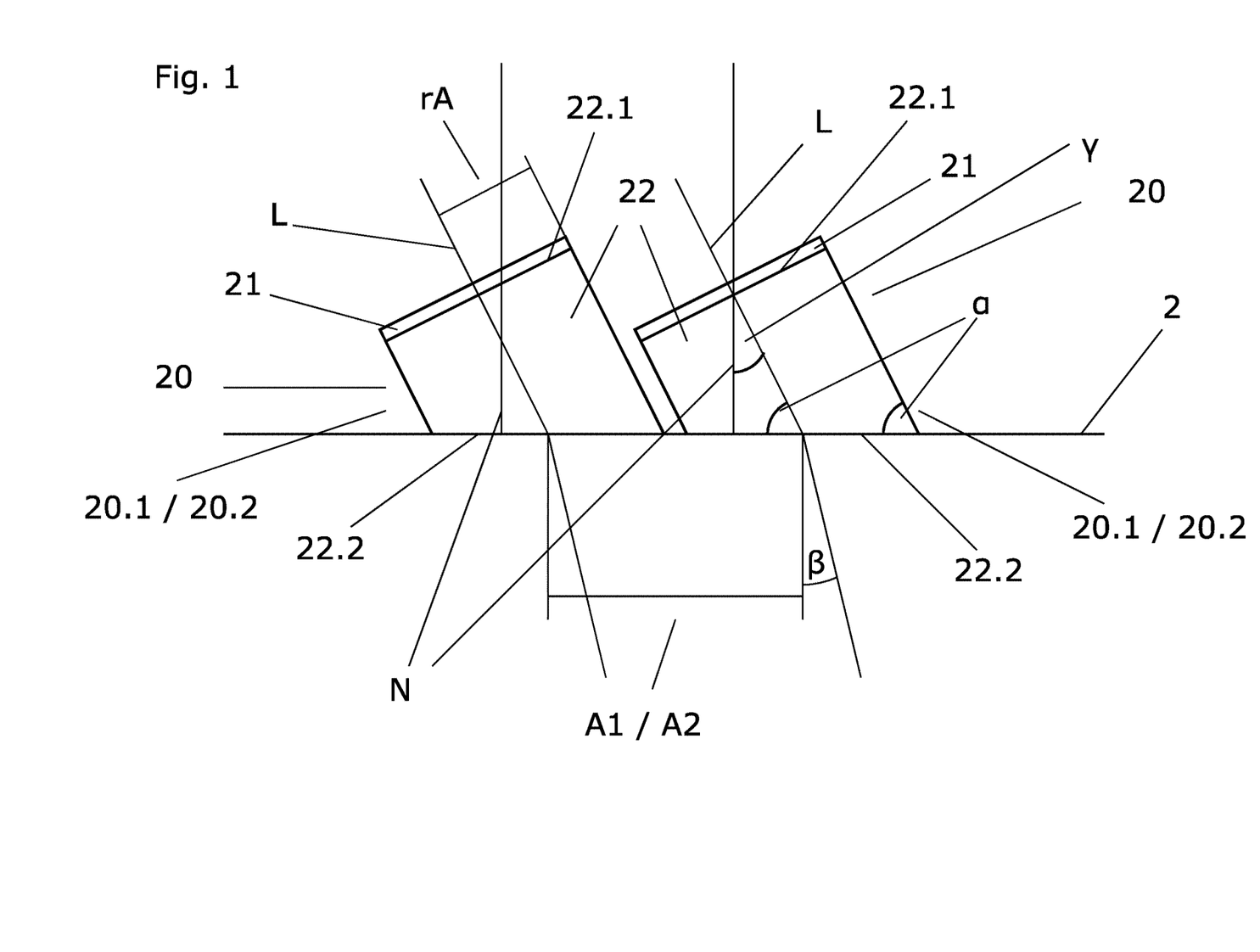
FIG. 1 shows two ultrasonic transducers of an arrangement of the present disclosure.

FIG. 1 shows a schematic construction of examples of ultrasonic transducers 20 and a part of an arrangement of the invention comprising two, first ultrasonic transducers 20.1 and two, second ultrasonic transducers 20.2, which are arranged on an outside of a measuring tube wall of a measuring tube 2. An ultrasonic transducer includes, in each case, at least one transducer element 21, preferably a piezoelectric transducer element, and a coupling element 22, wherein the transducer element is arranged on a first contact area 22.1 of the coupling element, and wherein the coupling element is acoustically and mechanically coupled with the measuring tube via a second contact area 22.2. The coupling element has a longitudinal axis L, along which travel ultrasonic signals produced by the transducer element 21 or received via the contact area 22.2. The transducer element is preferably disc shaped and has a radial extent rA. The radial extent of the transducer element does not necessarily correspond to a radial extent of the coupling element, such that the showing in FIG. 1 simply facilitates the drawing. The longitudinal axis has relative to a normal N of the second contact area an angle γ, so that ultrasonic signals are coupled inclined into the measuring tube. In the measuring tube, an ultrasonic signal path has an angle β to the normal, which angle β, in general, differs from the angle γ, when a velocity of sound in the coupling element differs from a velocity of sound in the medium. Neighboring first ultrasonic transducers 20.1 have a first separation A1 from one another, Correspondingly, adjoining second ultrasonic transducers have a second separation A2 from one another.

Typical values for the angle γ are 30° to 45°, depending on the materials utilized for the coupling element and measuring tube and the medium flowing through the measuring tube.

Figure 2:
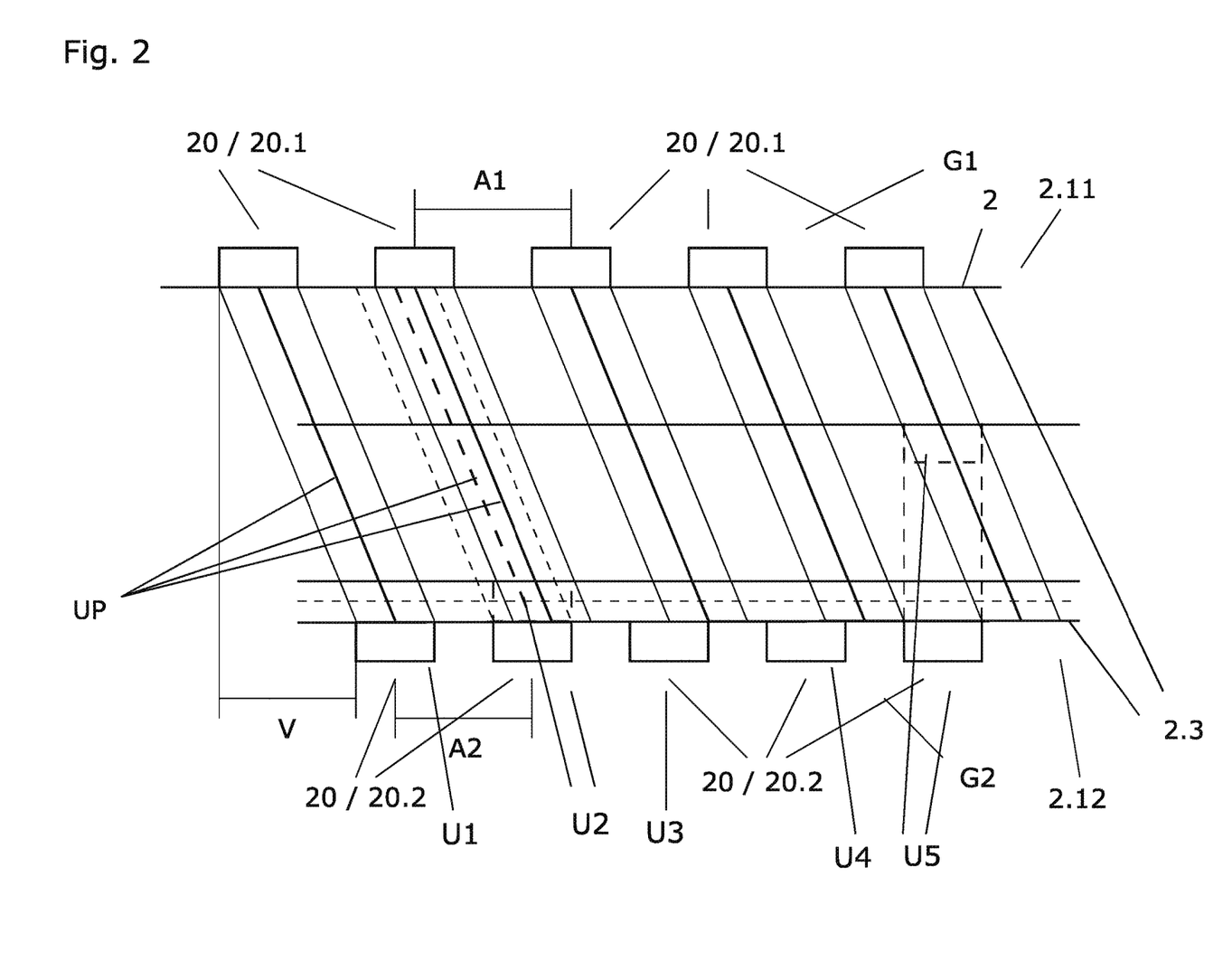
FIG. 2 shows geometric relationships of an arrangement of the present disclosure for ultrasonic transducers.

FIG. 2 shows geometric relationships of an arrangement of the invention for ultrasonic transducers, wherein a first group G1 of ultrasonic transducers 20 composed of first ultrasonic transducers 20.1 are arranged on a first side 2.11 in a measuring tube longitudinal section of the measuring tube 2, and wherein a second group G2 of ultrasonic transducers 20 composed of second ultrasonic transducers 20.2 are arranged on a second side 2.12 of the measuring tube 2 lying opposite the first side. The here selected number of, in each case, five ultrasonic transducers per group is for purposes of illustration and is not to be construed as limiting.

The first ultrasonic transducers 20.1 have a first separation A1 between neighbors, and the second ultrasonic transducers 20.2 have a second separation A2 between neighbors, wherein the separations A1 and A2 differ from one another. This has the result that in the case of superpositioning of an ultrasonic signal path UP defined by a first ultrasonic transducer with an ultrasonic signal path UP defined by a second ultrasonic transducer, such as happens for the first and second ultrasonic transducers of the left side, there is no superpositioning of the ultrasonic signal paths of the other illustrated first and second ultrasonic transducers. This is pointed out for the second set of first and second ultrasonic transducers on the left side by a solid line for the first ultrasonic transducer and an offset dashed line for the second ultrasonic transducer. In the latter case, a signal amplitude of a received ultrasonic signal registered by a receiving ultrasonic transducer is lower than in the case of a superpositioning of the signal paths between two ultrasonic transducers.

Since ultrasonic signals have a spatial expansion perpendicularly to their propagation in the direction of an ultrasonic signal path, an increasing offset of two ultrasonic signal paths between an emitting ultrasonic transducer and a receiving ultrasonic transducer leads to an increased lessening of the received ultrasonic signal amplitude.

Due to the different separations A1 and A2, there are different measuring tube diameters, at which the ultrasonic signal path of a first ultrasonic transducer 20.1 and the ultrasonic signal path of a second ultrasonic transducer 20.2 superimpose. This is shown with the ultrasonic transducers U2 and U5. From this, a maximum relevant ultrasonic signal path offset can be derived for the ultrasonic transducer arrangement. This is the case, when a measuring tube diameter has a value, which lies exactly between two measuring tube diameter values, at which the ultrasonic signal path of a first ultrasonic transducer 20.1 and the ultrasonic signal path of a second ultrasonic transducer 20.2 superimpose.

Preferably, the transducer elements have a radial extent rA, wherein $rA > 3/(4*a)*A1*\sin(\alpha)$, and especially $rA > 1/(2*a)*A1*\sin(\alpha)$, or wherein $rA > 3/(4*a)*A1*\cos(\gamma)$, and especially $rA > 1/(2*a)*A1*\cos(\gamma)$.

Neglecting an ultrasonic signal expansion, a maximum relevant deviation, in this case an offset, of an ultrasonic signal path in a direction extending along a measuring tube axis, of a third of an ultrasonic signal width in parallel with the measuring tube axis would result. It has been found that, in this case, an ultrasonic signal amplitude in a receiving ultrasonic transducer is still sufficient for good signal processing.

Thus, by providing different separations A1 and A2, an ultrasonic, flow measurement worthwhile over a large measuring tube diameter range is enabled.

A here neglected wall thickness of the measuring tube 2 influences a sound entrance point into the medium relative to the coupling element. Those skilled in the art will, in given cases, take this into consideration.

Figure 3:
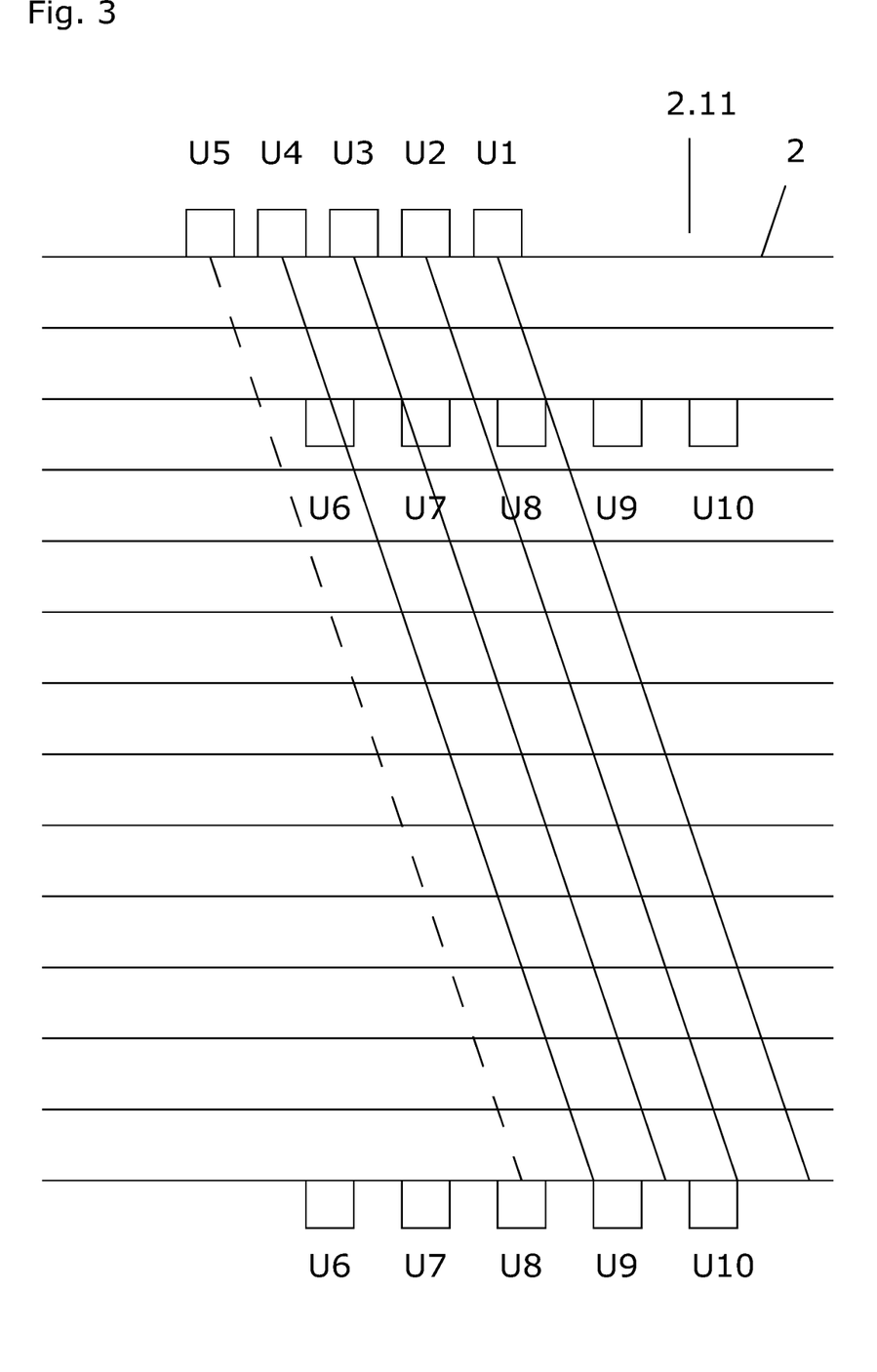
FIG. 3 shows by way of example, an arrangement of the present disclosure for ultrasonic transducers.

FIG. 3 presents, by way of example, a demonstrative arrangement of the invention for ultrasonic transducers on a measuring tube 2, wherein the parameter a is selected equal to 3. The inclined lines emanating from the ultrasonic transducers U1 to U5 of a first group of ultrasonic transducers show the course of ultrasonic signal paths. The horizontal lines display measuring tube diameters, at which ultrasonic signal paths emanating from the ultrasonic transducers U6 to U10 of a second group of ultrasonic transducers agree with ultrasonic signal paths of the first group of ultrasonic transducers. In order to show the effect of different measuring tube diameters, the second group of ultrasonic transducers is shown twice. In the case of a small measuring tube diameter, for example, the ultrasonic transducers U4 and U6 can form a usable ultrasonic transducer pair. For large diameters, an outer ultrasonic transducer, such as the ultrasonic transducer U5 shown here, can be required, in order to be able to form an ultrasonic transducer pair with an ultrasonic transducer U8 of the other group. Depending on measuring tube diameter, thus, different ultrasonic transducers of both groups of ultrasonic transducers can be used.

For the first group of ultrasonic transducers having a first number N1 of ultrasonic transducers and for the second group of ultrasonic transducers having a second number N2 of ultrasonic transducers, preferably: N1 is greater than or equal to a+1 and especially greater than or equal to a+2, and N2 is greater than or equal to a+1 and especially greater than or equal to a+2. N1 and N2, thus, do not such as shown in FIG. 3 need to be 5 or equal.

The greater is N1, N2, the greater is a measuring tube diameter range usable with an arrangement of the invention for ultrasonic transducers.

Those skilled in the art will form ultrasonic transducer arrangements according to their requirements.

Figure 4:
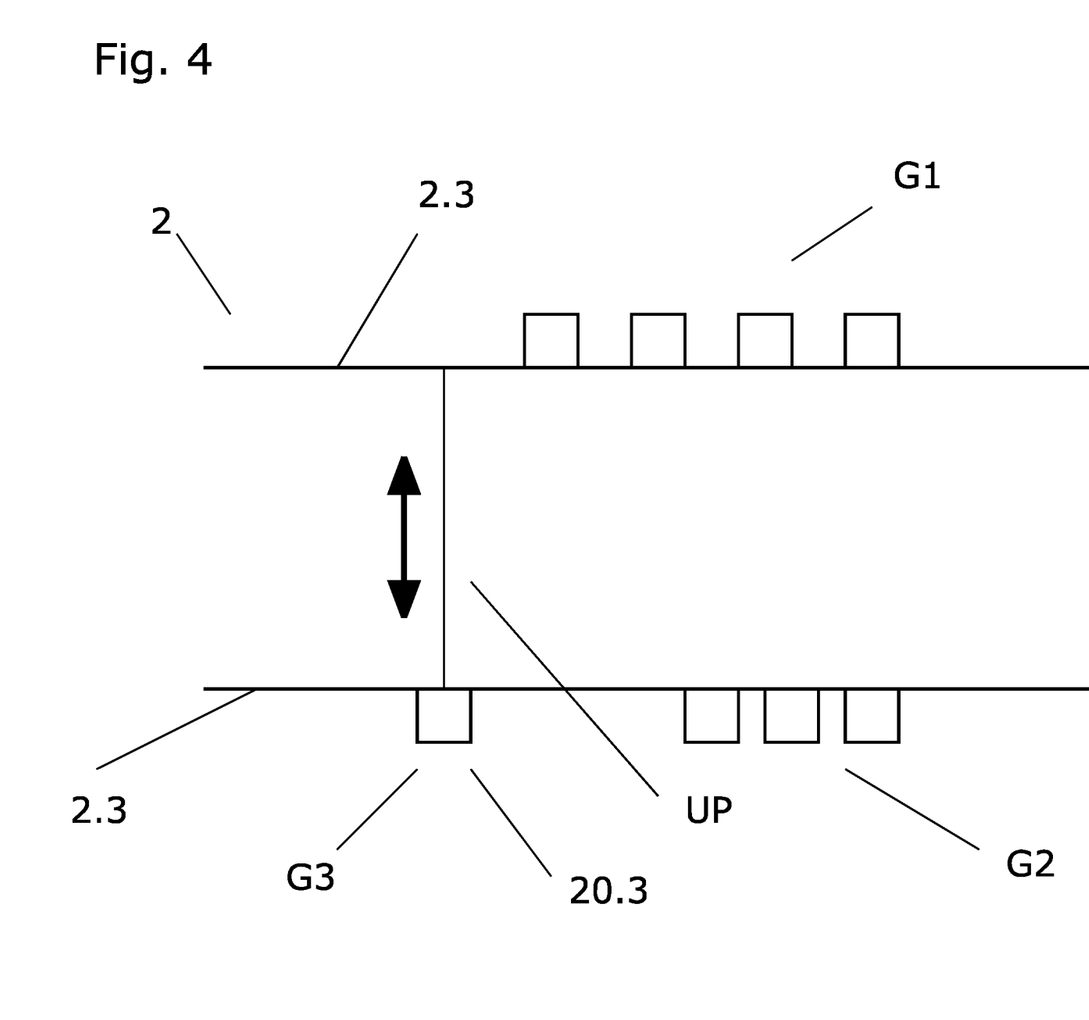
FIG. 4 shows by way of example, an arrangement of the present disclosure for ultrasonic transducers.

FIG. 4 presents, by way of example, an arrangement of the invention for ultrasonic transducers with first G1 and second G2 groups of ultrasonic transducers and a third group G3 with a third ultrasonic transducer 20.3.

The third ultrasonic transducer is adapted to radiate ultrasonic signals perpendicularly to the measuring tube wall 2.3 into the measuring tube 2 and to receive the ultrasonic signals reflected on an oppositely lying measuring tube side. Using a signal travel time, a measuring tube diameter can be deduced and therewith a usable pair of ultrasonic transducers with an ultrasonic transducer of the first group and an ultrasonic transducer of the second group can be selected for commissioning a clamp-on-ultrasonic, flow measuring point into operation. Thus, a testing of various ultrasonic transducers of the first and second groups can be limited or avoided.

The numbers and orientations of the ultrasonic transducers shown here are purely by way of example and have demonstrative purposes and are not to be construed as limiting.

Figure 5:
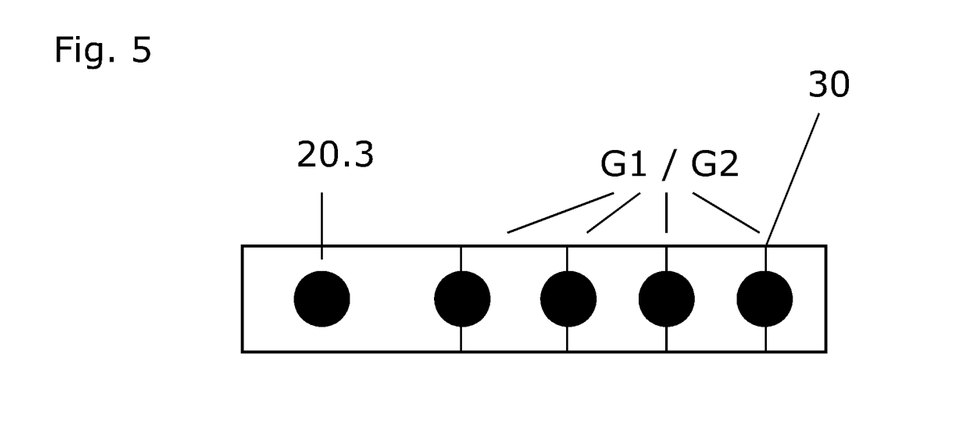
FIG. 5 shows an arrangement of ultrasonic transducers in a support body.

FIG. 5 shows ultrasonic transducers of a first group G1 or a second group G2 arranged in a support body 30 and held by such. The support body can have positioning elements, by means of which the ultrasonic transducers are positionable in a desired position in the case of installation in the support body. After positioning, the ultrasonic transducers can be potted in the support body. The ultrasonic transducers can, for example, be individually held in the support body, so that a fitting to, for example, a rough or uneven measuring tube surface is possible. The view is by way of example relative to the number and arrangement of the ultrasonic transducers and is not to be construed as limiting. Also, such as shown here, a third ultrasonic transducer 20.3 can be arranged in such a support body.

Figure 6:
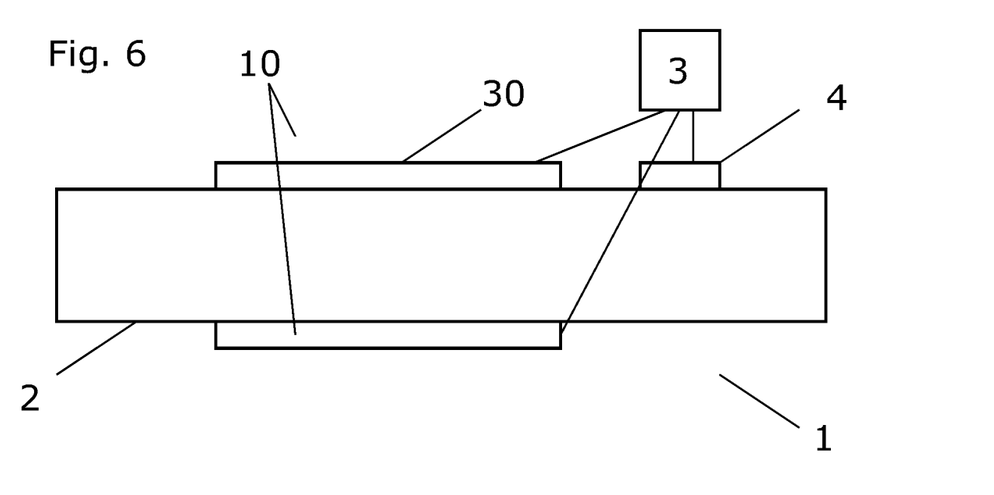
FIG. 6 shows a flow measuring point with an arrangement of ultrasonic transducers according to the present disclosure.

FIG. 6 shows by way of example a clamp-on ultrasonic, flow measuring point 1 having a measuring tube 2, an ultrasonic transducer arrangement 10 of the invention, a support body 30 for holding the ultrasonic transducer arrangement, a curvature sensor 4 for determining a measuring tube bend and an electronic measuring/operating circuit for operating the ultrasonic transducer and the curvature sensor and for providing flow measured values. A clamp-on ultrasonic, flow measuring point does not have to have a curvature sensor.

Figure 7:
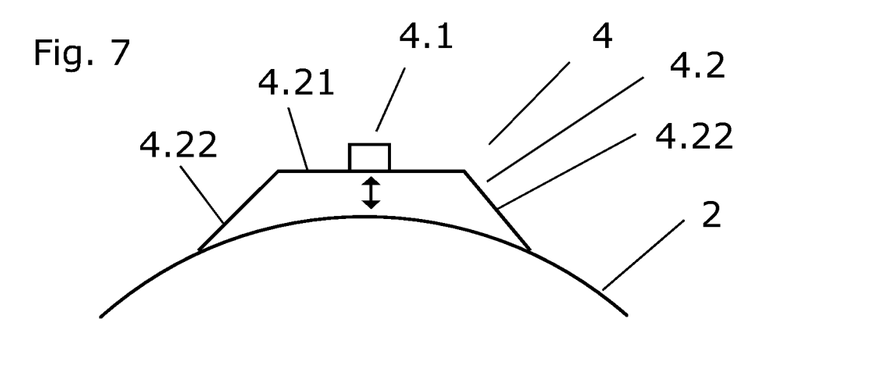
FIG. 7 shows a curvature sensor.

FIG. 7 shows a construction of a curvature sensor 4, by means of which a measuring tube outer diameter can be determined. With knowledge of the measuring tube outer diameter and a measuring tube thickness, an ultrasonic transducer pair to be used can be predetermined. A curvature sensor includes a separation sensor 4.1 and a spacer 4.2, which spacer has a central region 4.21 and two ends 4.22 bent from the central region. The spacer is placed on the measuring tube in parallel with a cross section of the measuring tube 2, wherein the central region has a measuring tube outer diameter dependent separation from a measuring tube outer surface. This separation is measured with the separation sensor 4.1 applied in the central region. Such a sensor can be, for example, an ultrasonic sensor or an optical sensor.

Commissioning the clamp-on ultrasonic, flow measuring point in operation requires a determining of an ultrasonic transducer pair comprising a first ultrasonic transducer and a second ultrasonic transducer. To this end, such as already mentioned, a measuring tube inner diameter as well as a measuring tube thickness can be determined by means of a third ultrasonic transducer and, as a result, an ultrasonic transducer pair can be determined. Alternatively or supplementally, also such as already mentioned, a curvature sensor can be applied. Alternatively or supplementally, a plurality of first and/or second ultrasonic transducers can, simultaneously or offset in time, transmit ultrasonic signals. A selection of an ultrasonic transducer pair can then be determined, for example, based on ultrasonic signal amplitude, which is measured by means of ultrasonic transducers selected as receivers. For the purpose of figuring out which transducers are involved, one or more features can be impressed on the ultrasonic signals of different ultrasonic transducers applied for transmitting ultrasonic signals.

For example, in the case of pulsed ultrasonic signals, a center frequency can be characteristic. Alternatively or supplementally, for example, ultrasonic signals can have different signal chirp.

At start-up, also a medium can be conveyed through the measuring tube and a travel time difference measurement of ultrasonic signals performed. In such case, ultrasonic signals without or with small travel time difference can be excluded from being taken into consideration. Such signals are, for example, signals, which are coupled from an original ultrasonic signal into the measuring tube, without traveling through the medium. In the case of a receiving ultrasonic transducer, thus, emanating from an original ultrasonic signal, a plurality of ultrasonic signals caused by various reflections can arrive superimposed or offset in time.

The invention claimed is:

1. An ultrasonic transducer arrangement for a clamp-on ultrasonic flow measuring point based on the travel time difference principle, the arrangement comprising:

a plurality of ultrasonic transducers, each adapted to be arranged on an outside of a measuring tube wall of a measuring tube of the clamp-on flow measuring point, wherein each ultrasonic transducer includes at least one transducer element configured to generate and/or receive ultrasonic signals and a coupling element, wherein the coupling element includes a first contact area and a second contact area, wherein the at least one transducer element is arranged on the first contact area, and wherein each ultrasonic transducer is adapted to contact the measuring tube via the respective second contact area, wherein each ultrasonic transducer is configured to radiate ultrasonic signals into the measuring tube and/or to receive ultrasonic signals emerging from the measuring tube, wherein the respective second contact areas each have a normal that defines a plane in which ultrasonic signal paths of the ultrasonic signals extend, wherein the plurality of ultrasonic transducers include a first group of adjoining first ultrasonic transducers arranged relative to a measuring tube longitudinal section on a first side of the measuring tube, and wherein the plurality of ultrasonic transducers include a second group of adjoining second ultrasonic transducers arranged relative to the measuring tube longitudinal section on a second side of the measuring tube opposite the first side, wherein each coupling element of the first ultrasonic transducers and of the second ultrasonic transducers have a longitudinal axis, wherein the longitudinal axis has, in each case, an interior angle at the corresponding second contact area, wherein the ultrasonic signal path extends in the coupling element in the direction of the longitudinal axis, wherein at least one first ultrasonic transducer is adapted to receive the ultrasonic signals of at least one second ultrasonic transducer and vice versa, wherein the adjoining ultrasonic transducers of the first group each have a first separation, A1, from each other, and wherein the adjoining ultrasonic transducers of the second group each have a second separation, A1, from each other, wherein the first separation and the second separation are unequal, wherein:

$$2*A1 >= A2 >= 1.125*A1.$$

2. The transducer arrangement of claim 1, wherein:

$$1.6*A1 >= A2 >= 1.25*A1.$$

3. The transducer arrangement of claim 1, wherein a relationship between the first separation and second separation corresponds to the following equation:

$$(a+1)*A1 = a*A2,$$

wherein a is a natural number that is greater than 1 and less 9.

4. The transducer arrangement of claim 3, wherein a is greater than 1 and less than 5.

5. The transducer arrangement of claim 3, wherein the first group of first ultrasonic transducers has a first number of ultrasonic transducers, and wherein a second group of second ultrasonic transducers has a second number of ultrasonic transducers, wherein the first number is greater than or equal to a+1, and the second number is greater than or equal to a+1.

6. The transducer arrangement of claim 5, wherein the first number is greater than or equal to a+2, and the second number is greater than or equal to a+2.

7. The transducer arrangement of claim 5, wherein:

$$rA > 1/(2*a)*A1*\sin(\alpha).$$

8. The transducer arrangement of claim 3, wherein the at least one transducer element has a radial extent, rA, wherein:

$$rA > 3/(4*a)*A1*\sin(\alpha).$$

9. The transducer arrangement of claim 1, further comprising a third group including at least a third ultrasonic transducer, which has a signal path extending perpendicular to the second contact area of the respective coupling element.

10. The transducer arrangement of claim 1, wherein the first group of first ultrasonic transducers and the second group of second ultrasonic transducers are each held by a support body configured to position and secure the first and second groups.

11. The transducer arrangement of claim 10, wherein the first and second ultrasonic transducers are each held individually in the corresponding support body.

12. A clamp-on ultrasonic flow measuring point for measuring a flow velocity of a medium flowing through a measuring tube, the measuring point comprising:
   a measuring tube adapted to convey a medium and having a measuring tube axis;
   an ultrasonic transducer arrangement as claimed in claim 1, wherein the ultrasonic transducer arrangement is oriented in parallel with the measuring tube axis; and
   an electronic circuit configured to operate the plurality of ultrasonic transducers and to determine and provide measured values of a flow velocity of the medium.

13. The clamp-on ultrasonic flow measuring point of claim 12, further comprising a curvature sensor configured to determine an outer diameter of the measuring tube, the curvature sensor including a separation sensor and a spacer, wherein the spacer has a central region and two ends adjoining the central region, wherein the ends are bounded from the central region by a bend or an angle,
   wherein the spacer is configured via the ends to contact the measuring tube, wherein the central region is adapted to be spaced from the measuring tube, and wherein a cross-section or longitudinal section through the spacer through the two ends is configured to extend in parallel with a measuring tube cross-section,
   wherein the separation sensor is arranged on the spacer in the central region, and
   wherein the electronic circuit is configured to operate the separation sensor.

14. The clamp-on ultrasonic flow measuring point of claim 13, wherein the separation sensor is an optical or acoustic separation sensor.

15. A method for commissioning the clamp-on ultrasonic flow measuring point as claimed in claim 12, the method comprising:
   transmitting, simultaneously or offset in time, ultrasonic signals from each of the first ultrasonic transducers and second ultrasonic transducers, respectively;
   receiving the transmitted ultrasonic signals from the first ultrasonic transducers by the second ultrasonic transducers, and receiving the transmitted ultrasonic signals from the second ultrasonic transducers by the first ultrasonic transducers, respectively; and
   determining at least one ultrasonic transducer pair of the first and second ultrasonic transducers to be used for a measurement operation based on a signal strength and/or a signal-noise ratio of the received ultrasonic signals using the electronic circuit.

16. The method of claim 15, wherein the ultrasonic signals are quasi continuous and differ in frequency, or
   wherein the ultrasonic signals are pulsed and differ in a center frequency of a frequency spectrum.

17. The method of claim 15, further comprising:
   conveying the medium through the measuring tube;
   examining portions of the received ultrasonic signals for presence of a travel time difference; and
   excluding portions of the received ultrasonic signals without travel time difference in determining the at least one ultrasonic transducer pair to be used for the measurement operation.

* * * * *